United States Patent [19]

Suetsuna et al.

[11] 4,004,990
[45] Jan. 25, 1977

[54] PROCESS FOR SEPARATING AND RECOVERING NICKEL AND COBALT

[75] Inventors: Airi Suetsuna; Toshimasa Iio, both of Niihama, Japan

[73] Assignee: Sumitomo Metal Mining Co., Limited, Tokyo, Japan

[22] Filed: Aug. 6, 1974

[21] Appl. No.: 495,288

[30] Foreign Application Priority Data

Sept. 21, 1973 Japan..........................48-105987

[52] U.S. Cl. ........................... 204/113; 75/101 BE; 75/101 R; 75/119; 75/139; 423/43; 423/48; 423/50; 423/139
[51] Int. Cl.² ....................... C25C 1/08; C22B 3/00
[58] Field of Search ............. 75/139, 119, 101 BE, 75/101 R; 204/113; 423/50, 43, 48, 139

[56] References Cited

UNITED STATES PATENTS

| | | | |
|---|---|---|---|
| 2,992,894 | 7/1961 | Hazen et al. | 75/101 BE |
| 3,085,054 | 4/1963 | Thornhill | 204/113 |
| 3,128,156 | 4/1964 | Long et al. | 75/101 BE |
| 3,455,680 | 7/1969 | Ashbrook et al. | 75/101 BE |
| 3,809,624 | 5/1974 | Kane et al. | 75/101 BE |
| 3,824,161 | 7/1974 | Aue et al. | 423/139 |
| 3,887,679 | 6/1975 | Wigstol et al. | 423/139 |
| 3,903,235 | 9/1975 | Cardwell et al. | 75/101 BE |

OTHER PUBLICATIONS

"Extraction of Sb w. Tertiary Amines" by Alian et al., Talanta, 1967, vol. 14, pp. 659, 668.

Primary Examiner—R. L. Andrews
Attorney, Agent, or Firm—Watson, Cole, Grindle & Watson

[57] ABSTRACT

A process for separating and recovering nickel and cobalt is provided wherein a sulfide material containing cobalt and nickel is first oxidation-roasted to remove volatiles and to convert the metallic values into their oxides. These oxides are then dissolved in an aqueous solution of HCl. The solution of chloride salts thus produced is contacted with an extraction solvent comprising an admixture of trinormaloctylamine and xylene whereby the bulk of the cobalt along with the iron, copper and zinc impurities and a portion of the manganese impurities present in the original material are stripped by the extraction solvent while the bulk of the nickel and the remainder of the manganese impurities remain in the aqueous phase. The aqueous phase containing the nickel and manganese impurities is treated with chlorine gas and nickelous carbonate whereby the manganese is precipitated as manganese dioxide. The nickelous chloride solution is then subjected to electrolysis to produce metallic nickel. The extraction solvent containing the cobalt and iron, zinc, copper and manganese impurities is contacted with water in an extraction stage and the cobalt along with the manganese impurities and a portion of the copper impurities are stripped by the water while the iron and zinc impurities and a portion of the copper impurities remain in the extraction solvent. The water containing the cobalt and copper and manganese impurities is first treated with $H_2S$ to precipitate the copper as copper sulfide and then with chlorine gas and cobaltous carbonate to precipitate the manganese as manganese dioxide. The remaining cobaltous chloride solution is then subjected to electrolysis to produce metallic cobalt.

8 Claims, 1 Drawing Figure

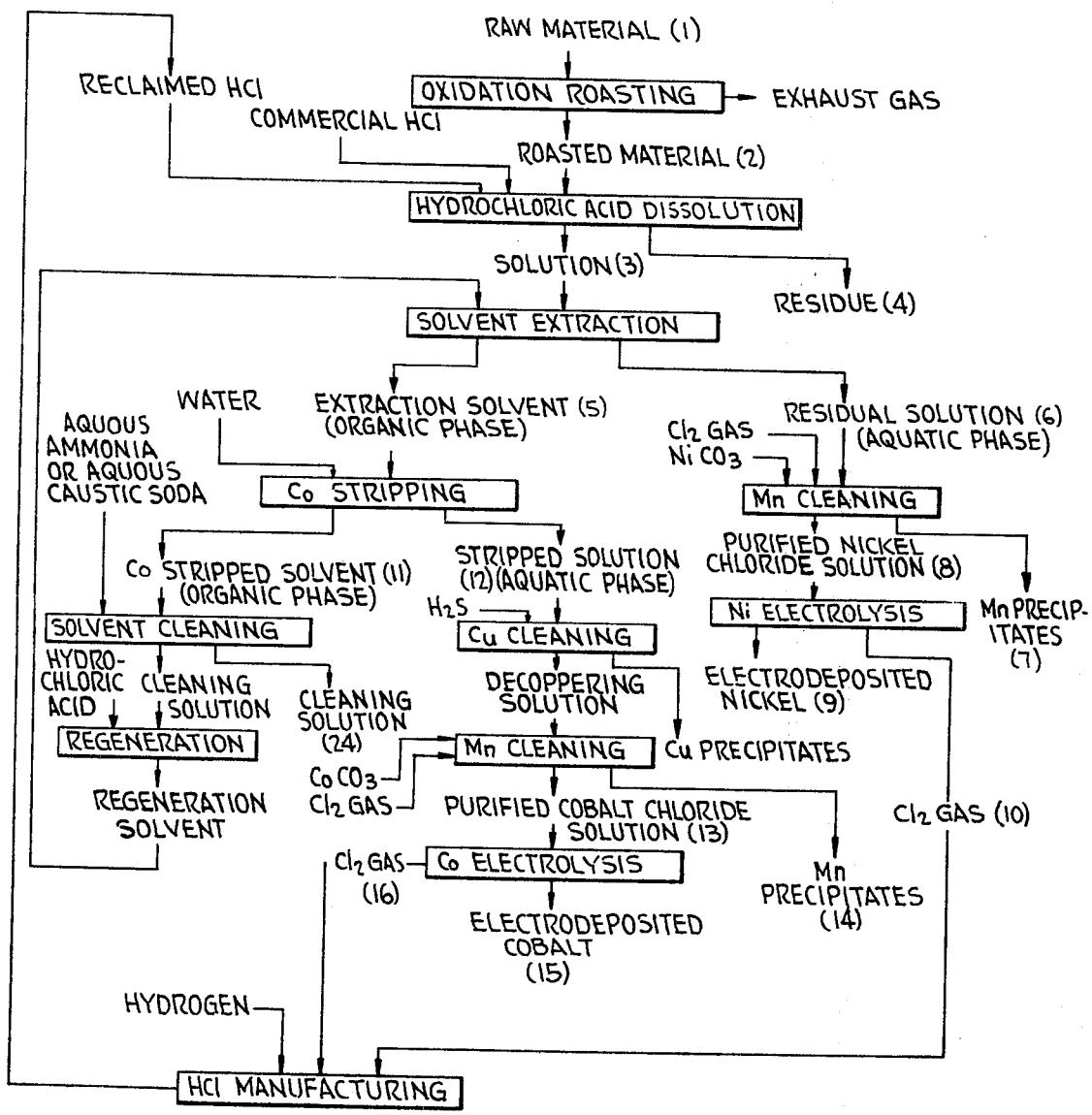

PROCESS FOR SEPARATING AND RECOVERING NICKEL AND COBALT

BACKGROUND OF THE INVENTION

1. Field of the Invention

The present invention relates to a process for separating nickel and cobalt from a sulfide material containing the same and recovering such values with minimal losses thereof.

2. Description of the Prior Art

Nickel ores generally contain a small amount of cobalt. In fact, low grade nickel ores sometimes contain up to one-tenth as much cobalt as nickel. These materials are separately by a sulfurizing process in the hydrometallurgical process and it is known that cobalt precipitated during the refining process from a solution containing nickel by the use of a sulfurizing agent or the like will generally contain co-precipitated nickel. It is also known that high purity metallic nickel and nickel compounds may be produced by subjecting the precipitated cobalt values to a series of precipitation steps and recycling as much nickel as possible back to the initial refining process. This repetition of cobalt precipitation steps causes an accumulation of cobalt in the precipitates separated from the solution containing nickel and some process is required for separating and recovering nickel and cobalt from the mixture thereof thus produced and for removing impurities such as iron, copper, zinc and manganese therefrom.

When roasted at 900°–950° C in the presence of oxygen, a mixture of nickel and cobalt sulfides may be stripped of combustibles and volatiles and converted into oxides which are soluble in hydrochloric acid. However, it is to be recognized that the solubility of the roasted product in hydrochloric acid decreases as the roasting temperature rises above 1000° C while the removal of sulfur impurities and the like is incomplete at roasting temperatures less than 900° C. In either event, the electrolysis of the nickel chloride using insoluble anodes is adversely affected.

It is known that if the nickel content of the roasted product comprises at least 20 percent by weight of the total nickel and cobalt content, almost all of the cobalt as well as all of the nickel in the mixed material may be dissolved in hydrochloric acid. The aqueous solutions containing chlorides of cobalt and nickel thus obtained generally also contains impurities such as iron, chromium, antimony, arsenic, copper, zinc and manganese which, in previously known processes, is removed prior to the separation of cobalt and nickel. After the removal of impurities, the remaining solution is then subjected to solvent extraction using a triamine such as trinormaloctylamine (TNOA) or triisooctylamine (TIOA) in a manner well known to those skilled in this art whereby the cobalt complexes with the triamine to form a complex salt having the formula $(R_3NH)_2CoCl_4$. This complex cobalt salt is dissolved in the triamine solvent while the nickel chloride remains in the aqueous solution and accordingly nickel and cobalt are separated. The cobalt extracted in the triamine solvent is then stripped with water to produce an aqueous solution containing purified cobalt from which metallic cobalt and cobalt compounds may be obtained. Likewise, metallic nickel and nickel compounds may be obtained from the nickel chloride solution.

The conventional processes discussed above require the substantially complete removal of impurities prior to the separation of nickel and cobalt, and, as a result, a certain amount of nickel and cobalt is removed with the impurities and is lost. Thus, yields are decreased.

SUMMARY OF THE INVENTION

The principal object of the present invention is to provide a process for separating and recovering nickel and cobalt from a mixture thereof with a minimal loss of the same.

The objects, purposes and aims of the invention are accomplished through the use of a novel process which comprises first forming an aqueous solution containing nickel and cobalt substances along with metallic impurities of the type which are normally associated with nickel and cobalt ores. This aqueous solution is contacted, in extracting relationship, with an organic extraction solvent capable of extracting and dissolving one of the substances, but not both, from the solution without removing all the impurities in advance. Thus are prepared an organic extract phase which contains the one substance along with a portion of the impurities and a first aqueous phase which contains the other substance and the remainder of the impurities. The organic extract phase is contacted, in extracting relationship, with water to produce a second aqueous phase which contains said one substance and at least part of said portion of said impurities. The aqueous phases are then separately treated to remove impurities therefrom and present separate purified solutions of the substances.

DESCRIPTION OF THE DRAWING

The single FIGURE is a flow diagram schematically illustrating the process of the present invention.

DETAILED DESCRIPTION OF THE INVENTION

In accordance with the present invention, it has been known that when cobalt is extracted with an organic extraction solvent such as TNOA or TIOA and is stripped with water, all of the iron and zinc and most of the copper contaminants remain in the organic solvent. Based on this matter, it has been provided that the amount of nickel and cobalt lost during the removal of impurities may be minimized and that separate aqueous solutions of highly purified nickel and cobalt may be obtained without the necessity for removing impurities from an aqueous solution containing both nickel and cobalt.

The single FIGURE in the drawing is a flow diagram illustrating a typical process for separating and purifying nickel and cobalt in accordance with the concepts and principles of the present invention. The reference numerals in the drawing refer to applicable Tables as set forth below.

100 kilograms of a sulfide material containing the components indicated in Table 1 was oxidation-roasted in a Herreshoff furnace for 2 hours at 900° C.

Table 1

| Chemical Composition | | Total Weight Kilograms | Total Weight Kilogram-Atoms |
|---|---|---|---|
| Ni | 21% | 21.00 | 0.3577 |
| Co | 14% | 14.00 | 0.2376 |
| Fe | 1% | 1.00 | 0.0179 |
| Cu | 1.5% | 1.50 | 0.0236 |
| Zn | 0.3% | 0.30 | 0.0046 |
| Mn | 1.0% | 1.00 | 0.0182 |
| S | 25% | 25.00 | 0.7798 |

During roasting, the total weight of the material was reduced to 50 kilograms due to evaporation of moisture and elimination of volatiles, etc. The composition of this roasted material is given in Table 2.

Table 2

| Chemical Composition | | Total Weight Kilograms | Total Weight Kilogram-Atoms |
|---|---|---|---|
| Ni | 42% | 21.00 | 0.3577 |
| Co | 28% | 14.00 | 0.2376 |
| Fe | 2% | 1.00 | 0.0179 |
| Cu | 3% | 1.50 | 0.0236 |
| Zn | 0.6% | 0.30 | 0.0046 |
| Mn | 2.0% | 1.00 | 0.0182 |
| S | 0.4% | 0.20 | 0.0062 |

124 liters of reclaimed hydrochloric acid containing 1.1718 kilogram-moles of HCl obtained by combining the chloride recovered during the electrolysis of nickel and cobalt as described below, with hydrogen, 12 liters of new commercially available hydrochloric acid containing 0.1363 kilogram-moles of HCl and 40 liters of wash water recovered after washing the manganese dioxide precipitated from the nickel chloride solution as described below, were added to the roasted material and the mixture was agitated for a period of 4 to 6 hours at a temperature of 55° to 60° C. This dissolution step resulted in the production of 174 liters of a chloride solution containing the components shown in Table 3 and 10 kilograms of undissolved residual matter containing the components shown in Table 4. It is to be noted that the chloride solution did not contain substantial quantities of free hydrochloric acid.

Table 3

| | grams/liter | Total Weight Kilograms | Total Weight Kilogram-Atoms |
|---|---|---|---|
| Ni | 120.29 | 20.93 | 0.3565 |
| Co | 80.17 | 13.95 | 0.2367 |
| Fe | 5.40 | 0.94 | 0.0168 |
| Cu | 8.62 | 1.50 | 0.0236 |
| Zn | 1.72 | 0.30 | 0.0046 |
| Mn | 5.75 | 1.00 | 0.0182 |
| Cl | 266.44 | 46.36 | 1.3078 |

Table 4

| Chemical Composition | | Total Weight Kilograms | Total Weight Kilogram-Atoms |
|---|---|---|---|
| Ni | 0.7% | 0.07 | 0.0012 |
| Co | 0.5% | 0.05 | 0.0008 |
| Fe | 0.6% | 0.06 | 0.0011 |
| Cl | 0.8% | 0.08 | 0.0022 |

The chloride solution described in Table 3 was contacted with 872 liters of an organic phase containing 40 volume percent TNOA (348.8 liters) and 60 volume percent xylene (523.2 liters) in a three-stage countercurrent solvent extraction process. Thus, the extraction was performed at a ratio of approximately five parts by volume of the organic phase to one part by volume of the chloride solution of Table 3. While the ratio of TNOA to xylene in the organic phase is not overly critical, it should be pointed out that in xylene solutions containing 10 to 30% by volume TNOA, it is possible for the latter to become emulsified. Moreover, a range of 30 to 40 percent TNOA by volume is preferred because such solutions provide an appropriate viscosity resulting in an efficient extraction process. It should also be noted that the concentration of nickel in the chloride solution should preferably be maintained at least 120 grams per liter to insure proper separation of nickel and colbalt.

The components extracted by 872 liters of the organic phase are set forth in Table 5 and the components remaining in the aqueous phase are set forth in Table 6.

Table 5

| | grams/liter | Total Weight Kilograms | Total Weight Kilogram-Atoms |
|---|---|---|---|
| Ni | 0.023 | 0.02 | 0.0003 |
| Co | 15.99 | 13.94 | 0.2366 |
| Fe | 1.08 | 0.94 | 0.0168 |
| Cu | 1.72 | 1.50 | 0.0236 |
| Zn | 0.34 | 0.30 | 0.0046 |
| Mn | 0.8 | 0.70 | 0.0127 |

Table 6

| | grams/liter | Total Weight Kilograms | Total Weight Kilogram-Atoms |
|---|---|---|---|
| Ni | 120.17 | 20.91 | 0.3562 |
| Co | 0.06 | 0.01 | 0.0002 |
| Fe | 0 | 0 | 0 |
| Cu | 0 | 0 | 0 |
| Zn | 0 | 0 | 0 |
| Mn | 1.72 | 0.30 | 0.0055 |
| Cl | 146.55 | 25.5 | 0.7193 |

The aqueous solution described in Table 6 was treated with $NiCO_3$ to maintain the pH of the solution at about 3.5 and was treated with $Cl_2$ gas for a period of one hour while the temperature was maintained at about 55° C. Thus, the manganese contained in the solution was precipitated and separated as manganese dioxide. The manganese dioxide was washed with an aqueous hydrochloric acid solution to remove any nickel which might have co-precipitated therewith and this solution was added to the hydrochloric acid solutions utilized for dissolving the oxidation-roasted materials. The data relating to the manganese precipitate are shown in Table 7 and the components remaining in the purified nickel chloride solution are set forth in Table 8.

Table 7

| | Total Weight Kilograms | Total Weight Kilogram-Atoms | Total Weight of Precipitate Kilogram |
|---|---|---|---|
| Mn | 0.3 | 0.0055 | 0.55 |

Table 8

| | Total volume of solution 174 | | |
|---|---|---|---|
| | grams/liter | Total Weight Kilograms | Total Weight Kilogram-Atoms |
| Ni | 120.17 | 20.91 | 0.3562 |
| Co | 0.06 | 0.01 | 0.0002 |
| Cl | 144.83 | 25.2 | 0.7109 |

20.92 kilograms of electrodeposited nickel was obtained by electrolysis of 174 liters of the nickel chloride solution described in Table 8. Insoluble anodes were used with a cathode current density of 2 to 3 $A/dm^2$. An analysis of this electrodeposited nickel is given in Table 9. The chlorine gas generated during the electrolysis is shown in Table 10.

Table 9

| | Weight Percent | Total Weight Kilograms | Total Weight Kilogram-Atoms |
|---|---|---|---|
| Ni | 99.93 | 20.91 | 0.3562 |
| Co | 0.05 | 0.01 | 0.0002 |

Table 10

| | Total Weight Kilograms | Total Weight Kilogram-Atoms | Total Amount Kilogram-Moles |
|---|---|---|---|
| $Cl_2$ | 25.2 | 0.7109 | 0.3554 |

The organic phase containing the components set forth in Table 5 was contacted with 232 liters of water in a three-stage counter-current extraction process. Since the volume of the organic phase was 872 liters, the contact ratio was 1:3.8. All of the iron and zinc and the bulk of the copper impurities remained in the organic phase while the cobalt, the manganese impurities and a small portion of the copper were extracted by the water. The components remaining in the organic phase are shown in Table 11 while the components extracted in the water stripping phase are shown in Table 12.

Table 11

| | grams/liter | Total Weight Kilograms | Total Weight Kilogram-Atoms |
|---|---|---|---|
| Ni | 0 | 0 | 0 |
| Co | 0 | 0 | 0 |
| Fe | 1.08 | 0.94 | 0.0168 |
| Cu | 1.38 | 1.20 | 0.0189 |
| Zn | 0.34 | 0.30 | 0.0046 |
| Mn | 0 | 0 | 0 |

Table 12

| | Total volume of solution 232 liters | | |
|---|---|---|---|
| | grams/liter | Total Weight Kilograms | Total Weight Kilogram-atoms |
| Ni | 0.09 | 0.02 | 0.0003 |
| Co | 60.09 | 13.94 | 0.2365 |
| Fe | 0 | 0 | 0 |
| Cu | 1.29 | 0.30 | 0.0047 |
| Zn | 0 | 0 | 0 |
| Mn | 3.02 | 0.70 | 0.0127 |
| Cl | 77.59 | 18.00 | 0.5078 |

The water phase described in Table 12 was treated with $H_2S$ for a period of 20 minutes at a temperature of 55° C while the pH was maintained at about 1.5. As a result of such treatment with $H_2S$, all of the copper contamination was precipitated as CuS. In this operation, it has been found that substantial co-precipitation of cobalt may be prevented by maintaining the pH in the range of 1 to 1.5.

Subsequently, the decopperized solution was treated with $CoCO_3$ to maintain the pH at about 3.5 and was treated with chlorine gas for a period of one hour while the temperature was maintained at 55° C. Thus, the manganese was precipitated as manganese dioxide. It is to be noted that 0.0051 kilogram-moles (0.3 kilograms) of cobalt is oxidized to the tri-valent stage by this operation and the same is co-precipitated as $CoCl_3$ with the $MnO_2$ and is lost. The components remaining in the purified cobalt chloride solution obtained by the foregoing treatment are shown in Table 13 while the components present in the precipitated manganese phase are shown in Table 14.

Table 13

| | Total volume of solution 232 liters | | |
|---|---|---|---|
| | Grams/liter | Total Weight Kilograms | Total Weight Kilogram-Atoms |
| Ni | 0.09 | 0.02 | 0.0003 |
| Co | 58.79 | 13.64 | 0.2316 |
| Cl | 70.69 | 16.4 | 0.4626 |

Table 14

| | Chemical Composition | Total Weight Kilograms | Total Weight Kilogram-Atoms |
|---|---|---|---|
| Co | 15 | 0.30 | 0.0051 |
| Mn | 36 | 0.70 | 0.0127 |

The cobalt chloride solution set forth in Table 13 was electrolyzed using insoluble anodes and a cathode current density of approximately 2 to 3 $A/dm^2$. 15.14 kilograms of electrodeposited cobalt was thereby obtained. The analysis of this electrodeposited cobalt is shown in Table 15 while the data for the chlorine gas generated during the electrolysis are shown in Table 16.

Table 15

| | Weight Percent | Total Weight Kilograms | Total Weight Kilogram-Atoms |
|---|---|---|---|
| Ni | 0.17 | 0.02 | 0.0003 |
| Co | 99.8 | 13.64 | 0.2316 |

Table 16

| | Total Weight Kilograms | Total Weight Kilogram-Atoms | Total Weight Kilogram-Moles |
|---|---|---|---|
| $Cl_2$ | 16.4 | 0.4626 | 0.2313 |

The chlorine gases shown in Table 16 and Table 10 were combined with hydrogen to prepare hydrochloric acid for use in the initial dissolution step.

The stripped organic phase containing the components set forth in Table 11 above was contacted with 872 liters of an aqueous solution of either ammonia or sodium hydroxide in a three-stage counter-current extraction process. The contaminants from the organic phase were stripped by this cleaning solution which contained the components shown in Table 17 subsequent to this cleaning step.

Table 17

| | grams/liter | Total Weight Kilograms | Total Weight Kilogram-Atoms |
|---|---|---|---|
| Fe | 1.08 | 0.94 | 0.0168 |
| Cu | 1.38 | 1.20 | 0.0189 |
| Zn | 0.34 | 0.30 | 0.0046 |
| Cl | 3.30 | 2.90 | 0.0806 |

The used organic extraction solvent was then treated with 174 liters of an aqueous solution containing 21.8 kilograms of hydrochloric acid to renew its extraction capability. Thereafter the regenerated organic extraction solvent was repeatedly used for the solvent extraction.

In prior art processes involving decopperization with hydrogen sulfide at a pH of 1 to 1.5, the amount of nickel and cobalt which is co-precipitated with the copper is generally equal to about one-tenth of the weight of the latter. In prior dezincification processes utilizing hydrogen sulfide at a pH of about 3, the total amount of nickel and cobalt which co-precipitates with the zinc is generally equal to almost double the weight of the zinc. In deferrization processes utilizing $NiCO_3$ or $Na_2CO_3$ at pH of 2.6 to 2.9, the total amount of nickel and cobalt which co-precipitates with the iron is almost equal to the weight of the latter. Likewise, in demanganization processes utilizing soda ash, $NiCO_3$ and $CoCO_3$ at a pH of 3.5, the total nickel and cobalt which co-precipitates with the manganese is almost equal to the weight of the latter.

Accordingly, if such prior art cleaning processes were performed on the solution of Table 3 above, approximately 8% by weight of the total amount of nickel and cobalt in the solution would be co-precipitated with the contaminants and lost. On the other hand, by utilizing the process of the present invention, the only loss is the cobalt which co-precipitates with the $MnO_2$ as $CoCl_3$. As can be seen from Table 14, the total amount which is lost is only 0.30 kilograms which represents only about 1 percent by weight of the total amount of nickel and cobalt in the original chloride solution. Thus, the loss of nickel and cobalt has been minimized and the yield of these substances has been correspondingly increased.

What is claimed is:

1. A process for separating and recovering nickel and cobalt from a mixed aqueous chloride solution containing nickel and cobalt, as well as iron, copper, zinc and manganese as impurities, comprising:
   contacting the chloride solution, in extracting relationship, with a triamine organic solvent selected from the group consisting of trinormaloctylamine and triisooctylamine to produce (1) an organic extract phase containing the amines and said cobalt, together with the iron, copper and zinc impurities, and at least a portion of the manganese impurities, and (2) a first aqueous phase containing said nickel together with the remainder of the manganese impurities;
   treating said nickel-containing first aqueous phase to cause the manganese therein to precipitate and thereby provide a purified solution of nickelous chloride;
   contacting said organic extract phase, in extracting relationship, with water to produce (1) a second aqueous phase containing said cobalt together with the manganese impurities and a portion of the copper impurities, and (2) an organic solvent phase containing said amines and the iron and zinc impurities, together with the remainder of the copper impurities; and
   treating the cobalt-containing second aqueous phase to remove the copper and manganese impurities therefrom and thereby provide a purified solution of cobaltous chloride.

2. A process as set forth in claim 1 wherein said treating of the cobalt-containing second aqueous phase to remove the copper and manganese impurities therefrom comprises firstly removing the copper from the aqueous phase by adding $H_2S$ to thereby precipitate the copper as copper sulfide, and secondly adding chlorine gas and cobaltous carbonate to the aqueous phase to precipitate the manganese as manganese dioxide.

3. A process as set forth in claim 1 wherein said purified solution of cobaltous chloride is subjected to electrolysis to recover the cobalt therein as metallic cobalt.

4. A process as set forth in claim 11 wherein said purified solution of nickelous chloride is subjected to electrolysis to recover the nickel therein as metallic nickel.

5. A process for separating and recovering nickel and cobalt values from a sulfide material containing nickel and cobalt and the iron, copper, zinc and manganese impurities normally present in such material, said process comprising:
   roasting said sulfide material in the presence of oxygen at a temperature of 900° to 1000° C to convert sulfides into oxides;
   admixing said roasted material with an aqueous solution of HCl to provide a chloride solution of nickel and cobalt and said impurities;
   contacting said chloride solution, in extracting relationship, with an organic extraction solvent containing trinormaloctylamine and xylene to produce (1) an extract phase containing said amine and the cobalt, iron, copper and zinc impurities, and at least a portion of the manganese impurities, and (2) an aqueous phase containing nickel and the remainder of the manganese impurities;
   treating said nickel-containing aqueous phase with chlorine gas and nickelous carbonate to cause the manganese therein to precipitate and thereby provide a purified solution of nickelous chloride;
   contacting said extract phase, in extracting relationship, with water to produce (1) an aqueous phase containing the cobalt and manganese impurities, and a portion of the copper impurities and (2) an organic solvent phase containing said amine and the iron and zinc impurities, and the remainder of the copper impurities;
   removing the copper present in said cobalt-containing aqueous phase; and
   treating said cobalt-containing aqueous phase with chlorine gas and cobaltous carbonate to cause the manganese therein to precipitate and thereby provide a purified solution of cobaltous chloride.

6. A process as set forth in claim 5 wherein said copper-removing step comprises trating said cobalt-containing aqueous phase with $H_2S$ such that the copper precipitates as copper sulfide.

7. A process as set forth in claim 5 including the step of contacting the organic solvent phase containing said amine and the iron and zinc impurities, and the remainder of the copper impurities, in extracting relationship, with an aqueous solution containing a base selected from the group consisting of ammonia and sodium hydroxide whereby the iron, zinc and copper impurities are removed from the organic solvent.

8. A process as set forth in claim 5 including the steps of separately subjecting said purified aqueous solutions to electrolysis to produce metallic cobalt and metallic nickel, respectively.

* * * * *